United States Patent
Maheshwari et al.

(10) Patent No.: US 11,991,292 B2
(45) Date of Patent: May 21, 2024

(54) SYSTEMS AND METHODS FOR USE IN APPENDING LOG ENTRIES TO DATA STRUCTURES

(71) Applicant: MASTERCARD INTERNATIONAL INCORPORATED, Purchase, NY (US)

(72) Inventors: Rajat Maheshwari, Singapore (SG); Charles Walton, Marshfield, MA (US); Karthik Ramanathan, Singapore (SG); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 533 days.

(21) Appl. No.: 17/221,731

(22) Filed: Apr. 2, 2021

(65) Prior Publication Data
US 2021/0314166 A1    Oct. 7, 2021

Related U.S. Application Data

(63) Continuation of application No. PCT/US2021/024161, filed on Mar. 25, 2021.

(60) Provisional application No. 63/005,012, filed on Apr. 3, 2020.

(51) Int. Cl.
    *H04L 9/32*      (2006.01)
    *G06F 11/34*     (2006.01)
    *H04L 9/30*      (2006.01)

(52) U.S. Cl.
    CPC ........ *H04L 9/3247* (2013.01); *G06F 11/3476* (2013.01); *H04L 9/30* (2013.01)

(58) Field of Classification Search
    USPC .......................................................... 713/176
    See application file for complete search history.

(56) References Cited

U.S. PATENT DOCUMENTS

| | | | | |
|---|---|---|---|---|
| 8,566,247 | B1* | 10/2013 | Nagel | H04L 63/045 |
| | | | | 380/270 |
| 9,853,977 | B1* | 12/2017 | Laucius | H04L 63/0815 |
| 10,171,248 | B2* | 1/2019 | King | H04L 9/3268 |
| 11,012,495 | B1* | 5/2021 | Vakalapudi | H04L 9/3263 |
| 2002/0029337 | A1* | 3/2002 | Sudia | H04L 9/3268 |
| | | | | 380/282 |
| 2003/0196099 | A1* | 10/2003 | Lampson | G06F 9/468 |
| | | | | 713/189 |

(Continued)

*Primary Examiner* — Kambiz Zand
*Assistant Examiner* — Mahabub S Ahmed
(74) *Attorney, Agent, or Firm* — Harness, Dickey & Pierce, P.L.C.

(57) ABSTRACT

Systems and methods are provided for use in appending log entries to a data structure. One exemplary method includes receiving, at a communication device, a log entry from a terminal and signing the log entry with a private key of a key pair specific to the communication device. The method also includes transmitting the signed log entry to an identity provider (IDP) and receiving, by the communication device, from the IDP, a signed, encrypted log entry. The method further includes verifying, by the communication device, a signature of the signed, encrypted log entry based on a public key associated with a key pair specific to the IDP and then appending the encrypted log entry to a digital identity included in the communication device.

19 Claims, 5 Drawing Sheets

(56) References Cited

U.S. PATENT DOCUMENTS

| | | | |
|---|---|---|---|
| 2006/0129817 A1* | 6/2006 | Borneman | H04L 67/53 713/170 |
| 2006/0236382 A1* | 10/2006 | Hinton | G06F 21/41 726/8 |
| 2007/0101145 A1* | 5/2007 | Sachdeva | H04L 63/12 713/176 |
| 2008/0155267 A1* | 6/2008 | Lieber | H04L 9/321 713/183 |
| 2011/0013771 A1* | 1/2011 | Camenisch | H04L 9/3252 380/46 |
| 2011/0302412 A1* | 12/2011 | Deng | H04L 63/0407 713/155 |
| 2012/0023568 A1* | 1/2012 | Cha | H04L 63/0807 726/10 |
| 2013/0042110 A1* | 2/2013 | Shablygin | G06F 21/34 713/168 |
| 2013/0080769 A1* | 3/2013 | Cha | H04L 67/02 726/3 |
| 2013/0282580 A1* | 10/2013 | O'Brien | G06Q 20/24 705/44 |
| 2014/0020078 A1* | 1/2014 | Canning | H04L 63/0884 726/8 |
| 2014/0366108 A1* | 12/2014 | Cross | G06F 21/45 726/6 |
| 2015/0095999 A1* | 4/2015 | Toth | H04L 9/3263 726/6 |
| 2016/0234209 A1* | 8/2016 | Kahol | H04L 63/08 |
| 2017/0250972 A1* | 8/2017 | Ronda | H04L 9/0891 |
| 2018/0131685 A1* | 5/2018 | Sridhar | H04L 9/3226 |
| 2018/0205743 A1* | 7/2018 | McIver | H04L 9/14 |
| 2018/0219679 A1* | 8/2018 | Debois | H04L 9/321 |
| 2018/0288033 A1* | 10/2018 | Kamal | G06F 21/64 |
| 2019/0044940 A1* | 2/2019 | Khalil | H04L 9/3247 |
| 2019/0097812 A1* | 3/2019 | Toth | H04L 9/0841 |
| 2019/0197815 A1* | 6/2019 | Kamal | G07C 9/257 |
| 2019/0245693 A1* | 8/2019 | Iyer | G06Q 20/38215 |
| 2020/0076795 A1* | 3/2020 | Kamal | G06F 21/35 |
| 2020/0082124 A1* | 3/2020 | Pedersen | H04L 9/3226 |
| 2020/0100108 A1* | 3/2020 | Everson | H04L 9/0825 |
| 2020/0193426 A1* | 6/2020 | Kromer | G06F 17/40 |
| 2020/0374278 A1* | 11/2020 | Sundaram | G06N 3/02 |
| 2021/0119764 A1* | 4/2021 | Meghji | H04L 9/3239 |
| 2021/0133079 A1* | 5/2021 | Kannan | H04L 9/3239 |
| 2021/0266309 A1* | 8/2021 | Guccione | H04L 63/0815 |
| 2022/0029802 A1* | 1/2022 | Ebrahimi | G06F 21/64 |

\* cited by examiner

SYSTEMS AND METHODS FOR USE IN APPENDING LOG ENTRIES TO DATA STRUCTURES

CROSS-REFERENCE TO RELATED APPLICATIONS

This application is a continuation of PCT International Application No. PCT/US2021/024161, filed on Mar. 25, 2021, which claims the benefit of, and priority to, U.S. Provisional Application No. 63/005,012, filed on Apr. 3, 2020. This application also claims the benefit of, and priority to, U.S. Provisional Application No. 63/005,012, filed on Apr. 3, 2020. The entire disclosure of each of the above-referenced applications is incorporated herein by reference.

FIELD

The present disclosure is generally directed to systems and methods for use in appending one or more log entries to data structures.

BACKGROUND

This section provides background information related to the present disclosure which is not necessarily prior art.

People are known to be associated with identities. The identities are generally specific to the people and often include their names, government-based identifiers (e.g., Aadhaar numbers, social security numbers, etc.), mailing addresses, phone numbers, email addresses, etc. And, as part of certain interactions by the people with relying parties, the relying parties often verify the identities of the people through one or more physical documents such as, for example, driver's licenses, government issued cards or documents (e.g., birth certificates, etc.), utility bills, etc. In addition, the identities of the people may further be provided in the form of digital identities. The users may then be permitted to offer either physical documents or the digital identities as proof of their identities.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

In connection with various activities between users and relying parties (e.g., merchants, government, employers etc.), the users are often required by the relying parties to provide proof of their identities. Occasionally, the data requested by the relying parties may go beyond static information about the users. For example, a travel history of a user (broadly, attendance, presence, location data for the user, etc.) or a medical history of a user may be required (e.g., in connection with abiding by guidance from a Center for Disease Control (CDC) or other relevant party, etc.). Conventional digital identities do not include this type of information, whereby the users are forced to rely on other evidence of travel history or medical history. What's more, to the extent that related information may be derivable from such conventional digital identities, the information is not verified and/or associated with an identity provider. Uniquely, the systems and methods herein provide for appending one or more log entries to data structures associated with digital identities, for example, to expand content associated with the digital identities, where the content may relate to aspects users desired to prove or establish about themselves (e.g., to relying parties, etc.) by way of their digital identities.

Figure 1:
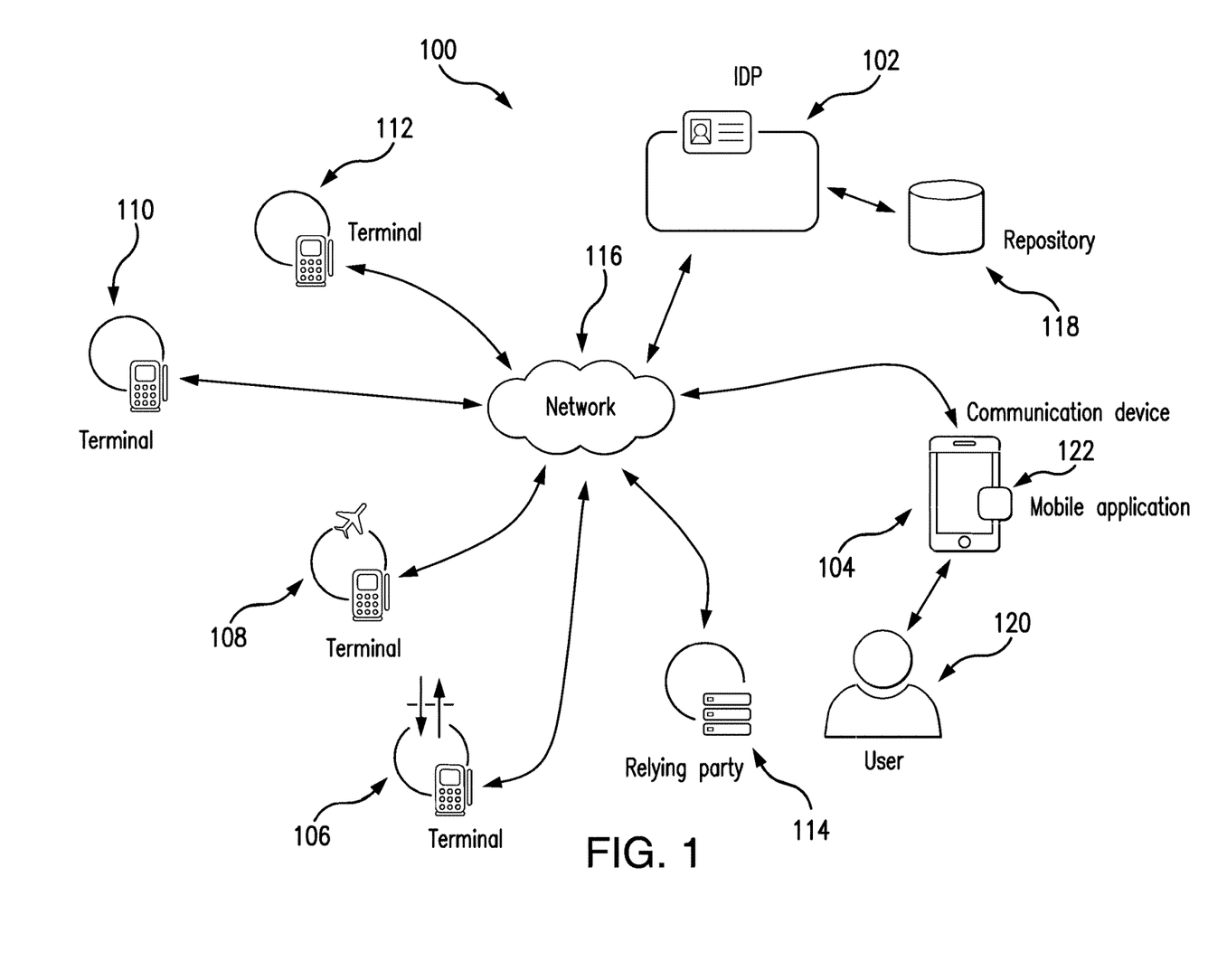
FIG. 1 illustrates an exemplary system of the present disclosure suitable for use in appending one or more log entries to data structures.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, relationships between users and identification providers and/or third parties in the system 100, particular types of devices utilized with digital identities, particular mobile applications associated with the users, relationships between users and relying parties in the system 100, privacy requirements, etc.

The system 100 generally includes an identification provider (IDP) 102, a communication device 104, a port of entry 106, an airport 108, a rental party 110, a hotel party 112, and a relying party 114, each of which is coupled to network 116 to provide communication between the entities/parties. The network 116 may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The IDP 102 of the system 100 generally is associated with forming and/or managing digital identities associated with users (e.g., for user 120, etc.). In connection therewith, the IDP 102 may participate in verifying an identity of a user, provisioning a digital identity to a user, and then providing the digital identity for the user to one or more relying parties, as requested and/or required. In FIG. 1, the IDP 102 is illustrated as a standalone service and/or device of the system 100. However, the IDP 102 may additionally, or alternatively, be incorporated in whole or in part with another party in the system 100, such as, for example, a payment network, a business entity, or a banking institution, etc. Specifically, for example, the IDP 102 may be incorporated, in whole or in part, into the Mastercard® payment network and configured to operate as described herein to provide one or more identity-based services to users via and/or in association with the Mastercard® payment network (wherein the Mastercard® payment network is then also configured to process transactions by users with merchants, etc.). It should be appreciated that while the IDP 102 is illustrated as a single entity and/or computing device in FIG. 1, the IDP 102 may be segregated into multiple different entities and/or computing devices in other embodiments, with data being exchanged therebetween, so that the IDP 102, overall, is still configured to operate as described herein.

The IDP 102 is further associated with a repository 118 of the system 100, which includes at least one data structure in which digital identities for users (e.g., including the user 120, etc.), once registered with the IDP 102, are stored. The repository 118, in this exemplary embodiment, is a stand-alone service or device in the system 100, but may be included in whole or in part in the IDP 102 in other embodiments. In the illustrated embodiment, the data structure(s) of the repository 118 includes a blockchain data structure, whereby the data structure includes a continually growing list of ordered records (where each record includes a time stamp and a reference or link to a prior record). In connection therewith, each block contains a cryptographic hash of the previous block, a timestamp, and content (e.g., personal identifying information, etc.). Once the block is recorded to the data structure, it may be considered immutable, as the block cannot be altered retroactively without alteration of all subsequent blocks, which requires consensus of a majority of the stakeholders in the data structure (e.g., the IDP 102, etc.).

The communication device 104 is generally a portable communication device, whereby the communication device 104 is carried with and/or around the user 120, as the user 120 travels from location to location (e.g., during travel, etc.). The communication device 104 may include, without limitation, a smartphone, a tablet, a laptop computer, a smartwatch, or another suitable device, etc. As shown in FIG. 1, the communication device 104 includes a mobile application 122, which is provided by and/or associated with the IDP 102, etc.

The port of entry 106 includes, often, a point controlled and/or operated by a government agency, such as, for example, Customs and Border Patrol (CBP) in the United States or other suitable agency or department. The port of entry 106 is generally tasked with controlling the flow of users entering or exiting a region, often a territory, province, or country. For example, the port of entry 106 may be configured to permit users to cross the border from country A into country B (i.e., as operated by a border agency for country B). In connection therewith, the port of entry 106 is configured to verify an identity of the users crossing into country B. The airport 108 may include a structure or location from which airplanes may takeoff or land in order to transport users from location to location. For a commercial airport, the airport 108 includes one or more ticketing zones (where users purchase tickets, check-in, get boarding passes, and/or check luggage, etc.), security zones (where users are screened for security risks, concerns, or issues, etc.), and gate zones (where users board airplanes, etc.). It should be appreciated that in some embodiments the port of entry 106 may be located at the airport 108 (e.g., for international flights, etc.), or not.

The rental party 110 provides, for example, rental vehicles to users, and the hotel party 112 provides accommodations, etc., for rent by users. The rental party 110 and the hotel party 112 are each disposed at a particular location in a region. And, the rental party 110 and the hotel party 112 are configured to rely on an identity of the user 120, for example, in connection with renting a vehicle to the user 120 or providing hotel accommodations to the user 120.

That said, each of the port of entry 106, the airport party 108, the rental party 110, and the hotel party 112 in the system 100 are considered trusted sources. It should be appreciated that more and/or different trusted sources may be included in other system embodiments, where, generally, the parties are configured, as described more below, to evidence a location of a user, in general or at a particular time (e.g., user 120 crossing a border from country A to country B on a particular time/date, etc.). For example, the trusted sources may further include a payment network involved in interactions by the user 120 (and other users) based on the digital identity of the user 120, or a government agency associated with issuing credentials, such as, for example, visas, passports, etc., records for all of which may be added to a digital identity of the user 120 as described herein. Further, the trusted sources may include one or more healthcare provider(s), whereby records may be generated for the user 120 with regard to a vaccination and/or immunization history of the user 120, a blood type of the user 120 (and, potentially, a transfusion history for the user 120), other medical data/records associated with the user 120, etc., all of which may be added to a digital identity of the user 120 as described herein. The trusted sources, as shown in FIG. 1, are each associated with a terminal. Each terminal is configured, at least in part, specifically to interact with the IDP 102 and/or the communication device 104 of the user 120, as described in more detail below. The terminals may include, for example, passport kiosks at border crossings, self-service kiosks for checking into flights and/or for checking baggage, scanners at airport gates, a POS terminals at rental car depos or hotels, etc. The terminals may be provided for the users (e.g., the user 120, etc.) to interact with individually in a self-service manner, or the terminals may be operated in connection with employees, customer service representatives, or agents associated with the particular trusted sources (e.g., a terminal operated by a gate agent at the airport 108, etc.), etc.

It should be appreciated that in some embodiments the trusted sources may be parties unrelated to travel, yet sufficiently situated to be able to define a location of users (e.g., date, time, place, etc.) (e.g., attendance of users at certain locations, etc.), based on interactions with the terminals, for example, in connection with verifying and/or requesting digital identities of users. Examples of such additional trusted sources may include, without limitation, healthcare (or medical) providers (and related medical histories/records), employers (and related employment (and attendance) histories), schools (and related education (and attendance) histories), etc. It should be further appreciated that trusted sources may include other parties associated with the users. For example, another exemplary trusted source may include a payment network and/or a payment account issuer, which interacts (without limitation) with an airline, rental party or hotel party, etc. in connection with a transaction by users therewith. As part of processing a transaction for the airplane ticket, the rental car, or the hotel room, etc., the airline, rental party or hotel party may provide travel details (e.g., a travel itinerary, etc.) to the payment network and/or the issuer. The payment network and/or issuer may then be configured to provide travel details to the IDP 102 based on an interaction with the payment network and/or the issuer, etc. (as a trusted party), as described below. What's more, the payment network and/or the issuer may be configured to provide travel details based on transaction data, for example, as evidence of a travel destination, location, etc., of the users (e.g., for a transaction in a specific state or country at a specific time, etc.).

The IDP 102 is further configured in the system as a backend for the mobile application 122 included in the communication device 104. The mobile application 122 may include a digital identity specific application, or it may include, generally, an application intended and/or suitable for additional or other uses (e.g., a financial application, a travel application, or a healthcare management application, etc.). In this manner, the mobile application 122 may include a standalone application or, potentially, a software development kit (SDK) included in a mobile application provided by another party and including related or unrelated purposes (e.g., a banking or credit application, a virtual wallet, a healthcare portal, etc.). In connection therewith, the IDP 102 is configured to provide backend support for the mobile application 122 and/or various functions and/or operations provided thereby, as described below. For example, the IDP 102 may be configured to form, register, and/or manage digital identities associated with users (e.g., for user 120, etc.) in association with the mobile application 122, and to store or maintain the digital identities in the repository 118, etc. That said, it should be appreciated that a separate backend, which is associated with the IDP 102, or not, for example, may be included in other system embodiments and configured to coordinate and/or interact between the IDP 102, the mobile application 122, the trusted sources, the relying party 114, and the other parties included in the system 100 (and other systems).

Further in the system 100, the relying party 114 may include an entity for which users may attempt to demonstrate (or may be requested to demonstrate in connection with an interaction with the relying party 114) a travel history (as described below) over a period of time. For example, the relying party 114 may include, without limitation, an employer of the user 120, a government agency or division managing the user 120 and/or the user's access, entry, condition, etc., a healthcare provider for the user 120, an insurance company, a service provider, etc. In one particular example, the relying party 104 may include an agency associated with disease control in the time of an outbreak, or an employer of the user 120 seeking evidence of the travel of the user 120 to ensure safe practices, or an entity seeking evidence of certain vaccinations or immunizations of the user 120, or an entity seeking evidence of certain medical data relating to the user 120, etc. In one or more embodiments, a trusted party may also be a relying party. For instance, the port of entry 106 may rely on the digital identity, and a travel history (as described below), in deciding to permit or not permit the user 120 to enter a country.

While only one IDP 102, one communication device 104, one port of entry 106, one airport 108, one rental party 110, one hotel party 112, one relying party 114, and one repository 118 are illustrated in the system 100, it should be appreciated that additional ones of these parts may be included in other system embodiments. What's more, one or more banking institution(s) and/or a payment network may be included in the system 100 of FIG. 1 and may include one or more of the parts illustrated in the system 100.

Figure 2:
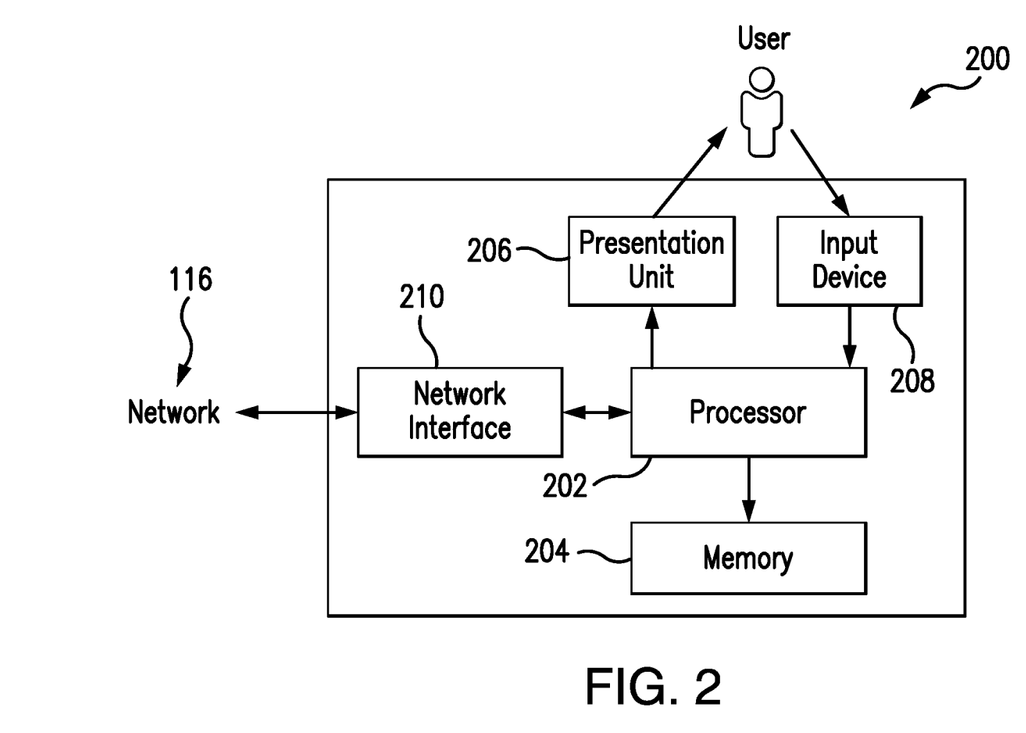
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, virtual devices, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the IDP 102, the port of entry 106, the airport 108, the rental party 110, the hotel party 112, and the relying party 114 may include or may be implemented in a computing device consistent with the computing device 200 (coupled to (and in communication with) the network 116). In addition, the communication device 104, the repository 118, and each of the terminals of the trusted sources may also be considered a computing device generally consistent with computing device 200 for purposes of the description herein. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data related to identities of users, digital identities, certificates, biometrics, keys, authentication credentials, location data, device identifiers for user computing devices, and/or other types of data (and/or data structures) suitable for use as described herein.

Furthermore, in various embodiments, computer-executable instructions (e.g., in the form of the mobile application 122 and/or an SDK associated therewith, etc.) may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein, thereby transforming the computer system into a special purpose computer system. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., displays a travel history of the user 120, information associated with a digital identity of the user 120, etc.), etc. And various interfaces (e.g., as defined by the mobile application 122, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user of the computing device 200 (i.e., user inputs) such as, for example, images of documents, biometrics, requests to share digital identities, etc. as further described below. The input device 208 may include a single input device or multiple input devices. The input device 208 is coupled to (and is in communication with) the processor 202 and may include, for example, one or more of a keyboard, a pointing device, a mouse, a stylus, a camera, a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, a GPS transmitter, a GPS receiver, combinations thereof (e.g., a GPS transceiver, etc.), or other device capable of communicating to one or more different networks herein (e.g., network 116, etc.) and/or with other devices described herein. Further, in some exemplary embodiments, the computing device 200 may include the processor 202 and one or more network interfaces incorporated into or with the processor 202.

Referring again to FIG. 1, in an implementation of the system 100, initially, the user 120 registers a digital identity with the IDP 102. In connection therewith (in generating the digital identity), the communication device 104 is configured, by the mobile application 122, to solicit and to receive personal identifying information (PII) from the user 120. This may include PII entered by the user 120, an image of the user 120 (e.g., a facial image, etc.), a biometric of the user 120 (e.g., a fingerprint, etc.), and/or an image of a physical document (e.g., a passport, a driver's license, a green card, a travel visa, etc., which include PII for the user 120), etc. The PII may include a name, a mailing address, a postal code, an email address, a phone number, a gender, a biometric, a passport number, a driver's license number, another government ID number (e.g., an Aadhaar number, a social security number, etc.), payment account data, vaccination records (or vaccination/immunization history), etc. Upon receipt of the PII, or prior, the communication device 104 is configured, by the mobile application 122, to generate a device key pair, which includes a device private key (DPriv) and a device public key (DPub), and to store the DPriv in the communication device 104 (e.g., in a secure element and/or trusted execution environment (TEE) thereof, in the Android Keystore® within an Android® operating system, etc.). The communication device 104 is configured, by the mobile application 122, to further transmit the PII, a biometric for the user, and/or an image of the user (encrypted with the DPriv key), to the IDP 102, along with the DPub key, an application ID specific to the mobile application 122, a device ID for the communication device 104 (e.g., an electronic serial number (ESN), MAC address, etc.), and a UID or unique identifier for the user 120.

In turn, the IDP 102 is configured to generate a platform key pair, including a platform private key (PPriv) and a platform public key (PPub) and to store the PPriv in memory (e.g., the memory 204, etc.). The IDP 102 is also configured to generate a symmetric key, i.e., an attribute key (AKey) and to store the AKey in the repository 118. In addition, the IDP 102 is configured (optionally) to decrypt and to verify the PII, biometric and/or image received from the communication device 104. For example, the IDP 102 may be configured to compare a facial image captured at the communication device 104 (of the user 120) to a facial image included in an image of a physical document, etc. included with the PII or already on record with the IDP 102. In another example, the IDP 102 may be configured to compare the PII received from the communication device 104 to PII extracted from the image of a physical document received from the user 120, etc. The IDP 102 may be further configured to compare a fingerprint captured at the communication device 104 to a reference biometric known or accessible to the IDP 102, or the IDP 102 may be configured to submit a biometric captured at the communication device 104 (or at/by an associated party) to a biometric repository for verification of not only the biometric but PII submitted therewith.

The IDP 102 is further configured to encrypt the PII, the biometric, and/or the image (broadly, data) received from the user 120 with the AKey, to sign the encrypted data with the PPriv key, and to transmit the signed encrypted data along with the PPub key to the communication device 104. The communication device 104 is configured, by the mobile application 122, to verify the signature with the PPub key and to then store the PPub key and the encrypted data in a data structure of the communication device 104 (in TEE, etc.), as the digital identity of the user 120.

It should be appreciated that each terminal of the port of entry 106, the airport 108, the rental party 110, and the hotel party 112 (and other trusted parties) is configured, like the communication device 104, to register with the IDP 102, with the specific location and/or association of the terminal with one of the trusted parties (e.g., as part of becoming a trusted party, as being a trusted party in general, etc.). For example, the terminal of the port of entry 106 may include a terminal ID, identifier associated with the port of entry 106, and a location for the port of entry 106, in place of the PII for the user 120. The terminal, like the communication device 104, is configured to then generate the key pair and to transmit the public key along with the device ID and UID for the terminal and/or the port of entry 106, etc. to the IDP 102. The terminal is further configured to receive the signed encrypted data from the IDP 102, to verify the encrypted data, and then to store the encrypted data along with the respective keys (e.g., in a secure element and/or trusted execution environment (TEE), etc.). In connection therewith, it should be appreciated that the communication device 104 and each of the terminals, as a computing device 200, may each be configured to determine a location at which the device is disposed (e.g., via GPS, etc.).

Thereafter, the user 120 may interact with one of the trusted parties (e.g., one or more of the port of entry 106, the airport 108, the rental party 110, and the hotel party 112, etc.), on the basis of the digital identity included in the communication device 104. For example, with reference to the port of entry 106, when the user 120 attempts to cross the border between country A and country B, for example, at the port of entry 106, the user 120 approaches the terminal of the port of entry 106, accesses the mobile application 122 at the communication device 104, and seeks to authenticate himself/herself to the application 122 (e.g., via a fingerprint, a facial image, a passcode, etc.). In turn, the communication device 104 is configured, by the mobile application 122, to authenticate the user 120 (e.g., via the biometric, the facial image, the passcode, etc.), to sign the stored encrypted data (with the DPriv) and then to transmit the signed encrypted data, along with the application ID for the mobile application 122, the UID for the user 120, and/or the device ID for the communication device 104, to the IDP 102 for decryption and return.

In response, the IDP 102 is configured to use the application ID, the UID, and/or device ID to retrieve the DPub key and the AKey from memory and to verify the signature of the encrypted data with the DPub key. The IDP 102 is then configured to decrypt the data using the AKey. The IDP 102 is configured to then sign the data with the PPriv key and to encrypt the data with the DPub key, and to transmit the signed encrypted data back to the communication device 104.

The communication device 104 is configured, by the mobile application 122, to verify the signature with the PPub key, to decrypt the data with the DPriv key, and to display and/or transmit the data, such as, for example, the PII (e.g., particular PII for the given application at the port of entry 106, all PII, other amounts/types of PII specified by the user 120, etc.) and/or image to an employee or otherwise of the port of entry 106. The data may then be relied on by the port of entry 106 in permitting the user 106 to enter country B, in this example.

What's more, the terminal of the port of entry 106, in this example, is configured to generate a log entry for the interaction between the user 120 (and/or communication device 104) and the terminal. The log entry may include, without limitation, the encrypted data stored therein, a location (e.g., as programmed into the terminal and/or determined, via GPS, by the terminal), a timestamp (e.g., DD/MM/YYYY HH/MM/SS, etc.), a description of the activity (e.g., entered country, checked-in for flight, boarded flight, rented car, added a visa, etc.), etc. The terminal is configured to then sign the log entry with its DPriv key of the terminal and to transmit the signed log entry, along with the application ID (or UID or device ID) for the terminal, to the communication device 104. It should be appreciated that each of the terminals shown in FIG. 1, and other terminals, may generate log entries in a similar manner and/or having similar content. What's more, when the trusted source is a payment network or issuer (as noted above), the terminal associated therewith (e.g., a POS terminal in connection with a purchase through a payment account credential from the communication device 104, etc.) may be configured to include transaction data in the description of the activity (e.g., the user 120 purchased flight from country A to country B; or the user 120 performed a series of purchases in country A, then a series of purchases in country B; etc.).

In turn, the communication device 104 is configured, by the mobile application 122, to receive the signed log entry (along with the application ID (or UID or device ID) for the terminal) from the terminal, to sign the log entry with the DPriv key, and to transmit the signed log entry to the IDP 102 along with its own application ID, device ID for the communication device 104 and/or UID for the user 120.

Upon receipt, the IDP 102 is configured to retrieve the DPub key and the AKey for the communication device 104 based on the application ID for the mobile application 122 (or UID for the user 120 or device ID for the communication device 104) and to verify the signature of the communication device 104 with the DPub key for the communication device 104. And then, the IDP 102 is configured to retrieve the DPub key and AKey for the terminal at the port of entry 106 based on the application ID (or UID or device ID) for the terminal and/or port of entry 106. The IDP 102 is configured to verify the signature of the terminal based on the DPub key of the terminal and to decrypt the log entry with the AKey for the terminal. When the signature is verified and/or the log entry is described, the IDP 102 is configured to append the log entry to the digital identity of the user 120. In particular, the IDP 102 is configured to encrypt the log entry, in whole or in part, along with the description of the activity, with the AKey for the communication device 104, to sign the encrypted log entry with the PPriv key, and to transmit the signed encrypted log entry to the communication device 104.

In turn, the communication device 104 is configured, by the mobile application 122, to verify the signature with the PPub and then store the encrypted data in the communication device 104 (e.g., in the TEE, etc.), as part of the digital identity of the user 120.

Table 1 illustrates a series of exemplary log entries for the user 120, which are appended to the digital identity of the user as described above, based on the user's interaction with the various terminals associated with the trusted sources. As shown, the exemplary log entries include a user ID for the user 120, a date of the given log entry, and activity associated with the log entry. The exemplary log entries also include a location, which may include a location of the terminal, as determined and/or reported by the terminal, or as determined by the communication device 104. This may be expressed as a city, state, postal code (e.g., address, etc.), or other specific location (e.g., by airport code, etc.), or a latitude and longitude of the location, etc.

TABLE 1

| User ID | Date | Activity | Location |
| --- | --- | --- | --- |
| 12345 | Jan. 05 | Added DL. Verified against government database | City, State, Postal Code |
| 12345 | Jan. 05 | Added Passport. Verified against government database | City, State, Postal Code |
| 12345 | Jan. 07 | Applied for visa for country X | City, State, Postal Code |
| 12345 | Jan. 10 | Checked-in into flight X at airport 108 to country X | Airport 108 |
| 12345 | Jan. 11 | Boarded flight X at airport 108 to country X | Airport 108 |
| 12345 | Jan. 12 | Went through port of entry 106 in country X | Airport, Country X |
| 12345 | Jan. 12 | Picked up rental car at party 110 in country X | Airport, Country X |
| 12345 | Jan. 2 | Checked-in into hotel 112 in country X | City, State, Postal Code |
| 12345 | Jan. 20 | Checked-in into flight Y to country Y | Airport, Country X |
| 12345 | Jan. 21 | Boarded flight Y to country Y | Airport, Country X |
| 12345 | Jan. 22 | Went through passport control in country Y | Airport, Country Y |

TABLE 1-continued

| User ID | Date | Activity | Location |
|---|---|---|---|
| 12345 | Jan. 22 | Checked-in into hotel Y in country Y | City, State, Postal Code |
| 12345 | Jan. 29 | Received vaccination from healthcare provider | City, State, Postal Code |

In this manner, by interacting with the terminal of the port of entry 106, and similarly with the other terminals illustrated in FIG. 1 (and other terminals of trusted parties not illustrated), a travel history of the user 120 is compiled and appended to the digital identity of the user 120, is stored in the communication device 104, and is usable later as part of the user's digital identity. In addition in the above example, the history may capture other aspects of the user's activates (as they relate to trusted parties), such as vaccination activities, etc. Alternatively, in other embodiments, the above may similarly be applied to capture vaccination histories of users, or other histories of the users (e.g., education histories, medical histories in general, etc.), where vaccines are received by the users from trusted parties or other activities are performed/encountered by the users, etc. (thereby creating a vaccination record or other record for the user as part of, or linked to, the users' digital identities). In this way, logs of particular histories/activities associated with the users' (e.g., their attendance in general, etc.) may be generated and similarly associated with the users' digital identities.

Thereafter, upon entering a country or upon interacting with an employer, for example (in person or via a website or application associated with the employer as a relying party), the user 120 may be asked to show evidence of a travel history (or to show other data included in his/her digital identity) to the employer (again, as a relying party). In lieu of papers or disparate electronic records, the user 120 is permitted to access the mobile application 122, at the communication device 104, and request the travel history. When the request originates from a relying party website or application (e.g., a website or application associated with the employer in the above example, etc.), the communication device 104 may optionally be configured, by the mobile application 122, to verify the relying party 114 based on a credential from the relying party website or application provided to the communication device 104. Further, the communication device 104 is configured, by the mobile application 122, to compile each of the log entries (and/or other requested data) included in the digital identity in memory of the communication device 104, to sign the log entries (and/or other data), and to transmit the signed log entries (and/or other data), along with the application ID for the mobile application 122 (or UID for the user 120 or device ID for the communication device 104), to the IDP 102. In turn, the IDP 102 is configured to retrieve the DPub key and the AKey from memory based on the application ID (or UID or device ID), to verify the signature of the log entries (and/or other data) based on the DPub key, and to decrypt the log entries (and/or other data) with the AKey. When verified and decrypted, the IDP 102 is configured to encrypt the log entries (and/or other data) with the DPub key, to sign the log entries (and/or other data) with the PPriv key, and to transmit the signed, encrypted log entries (and/or other data) to the communication device 104.

The communication device 104 is configured, by the mobile application 122, in turn, to retrieve the PPub key and to verify the signature of the IDP 102. The communication device 104 is further configured, by the mobile application 122, to decrypt the log entries (and/or other data) with the DPriv for the communication device 104 and to display the log entries (and/or other data) at the communication device 104 or to send the log entries (and/or other data) to the relying party 114. In this manner, an employee or agent associated with the relying party 114 is permitted to review, inspect or understand the travel history (and/or other data) of the user 120 (or other history of the user 102, for example, vaccination history, etc.).

Figure 3:
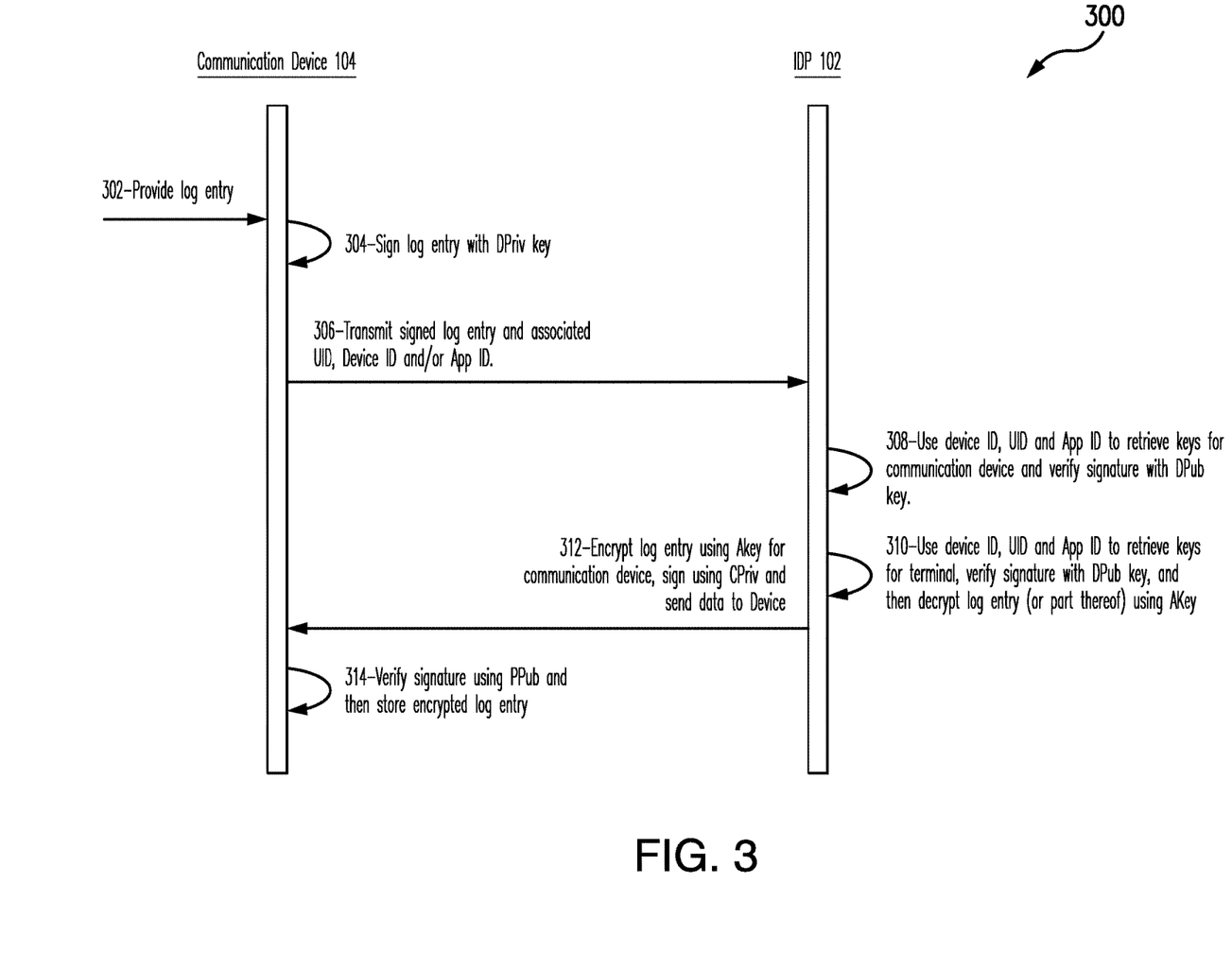
FIG. 3 illustrates an exemplary method, which may be implemented in connection with the system of FIG. 1, for use in appending one or more log entries comprising location data, to a data structure.

FIG. 3 illustrates an exemplary method 300 for use in appending a log entry (and, potentially, other data) to a digital identity. The exemplary method 300 is described as implemented in the IDP 102, the repository 118, the communication device 104, and the terminals of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

At the outset in the method 300, it should be appreciated that the user 120 already has a digital identity, as provisioned by the IDP 102, through registration, and that the exemplary terminal of the trusted party with which the user 120 interacts is also registered, as described above. As such, the IDP 102 has stored a PPriv key in the repository 114, along with a DPub key for the communication device 104 associated with the application ID (for the mobile application 122), the device ID (for the communication device 104), and/or the UID (for the user 120). The repository 118 also includes a DPub key and AKey for the terminal, as associated with the application ID, device ID, and/or UID of the terminal (or corresponding trusted party).

As such, in connection with presenting the digital identity of the user 120, via the communication device 104, to the airport 108 (in connection with checking in for a flight), for example, the terminal of the airport 108 (e.g., a gate terminal, etc.) transmits a log entry, which is signed by the terminal, to the communication device 104, at 302. The terminal generally provides the log entry to the communication device 104 in response to the digital identity, whether received at the terminal (e.g., via an image, NFC, or other wireless communication, etc.) or upon one or more inputs from an agent or operator associated with the terminal indicative of an approval of the digital identity, etc. The log entry includes, for example, a description of the activity (e.g., checking in for flight 12345 to country X, etc.), encrypted identifying data for the terminal, and a timestamp. It should be appreciated that other data may be included in the log entry as necessary or desired, including, for example, a location, etc. It should also be appreciated that while method 300 is described with reference to the terminal at the airport 108, the description is similarly applicable to the other terminals shown in FIG. 1 and still to other terminals associated with other trusted sources/parties. What's more, while the log entry is provided to the communication device 104 in this exemplary embodiment, it should be appreciated that the log entry, along with an identifier of the communication device 104 or the user 120 (e.g., the application ID, the device ID, the UID, etc.) (e.g., acquired by the terminal with the digital identity, etc.), may be provided instead to the IDP 102 rather than the communication device 104 (or independent of the communication device 104), etc.

In turn in the method 300, at 304, the communication device 104 signs the log entry with the DPriv key of the communication device 104 and, at 306, transmits the signed log entry with the UID, device ID, and/or application ID for the communication device 104, mobile application 122, and/or user 120, to the IDP 102. And, in response, the IDP 102, at 308, uses the UID, device ID and/or application ID to lookup or retrieve the keys for the communication device 104 from the repository 118, including, specifically, the DPub key, and then verifies the signature of the log entry with the DPub key.

Next, at 310, the IDP 102 uses the UID, device ID and/or application ID for the terminal to retrieve the keys for the terminal from the repository 118, and then verifies the signature of the terminal with the DPub key for the terminal. Also, at 310, the IDP 102 decrypts the encrypted portion, if any, of the log entry. The IDP 102 then encrypts the log entry using the AKey for the communication device 104, at 312, and signs the encrypted log entry. Also, at 312, the IDP 102 sends the signed, encrypted log entry to the communication device 104.

In response, the communication device 104 verifies, at 314, the signature on the signed, encrypted log entry with the PPub key stored therein. And, when the signature is verified, the communication device 104 stores the encrypted log entry in a data structure of the memory therein, such as, for example, a trusted execution environment (TEE), in a blockchain structure (e.g., between the IDP 102 and the communication device 101, etc.), or other suitable data structure in memory within the communication device 104.

In this manner, the communication device 104 appends the encrypted log entry to the digital identity stored in the communication device 104. As the user 120 travels from location to location, whereby the user 120 interacts with several terminals to present or show the user's digital identity, a travel history is created for the user 120. More specifically, an encrypted, secure travel history is created for the user 120, which is generally not accessible to the user 120, as each is encrypted with the AKey that is known only to the IDP 102 and stored in the repository 118. What's more, in this embodiment, there is no option in the mobile application 122 to modify, delete or otherwise alter the encrypted log entries in the communication device 104 (e.g., whereby the user 102 could not delete or otherwise modify data for a recent trip to country B, etc.).

Figure 4:
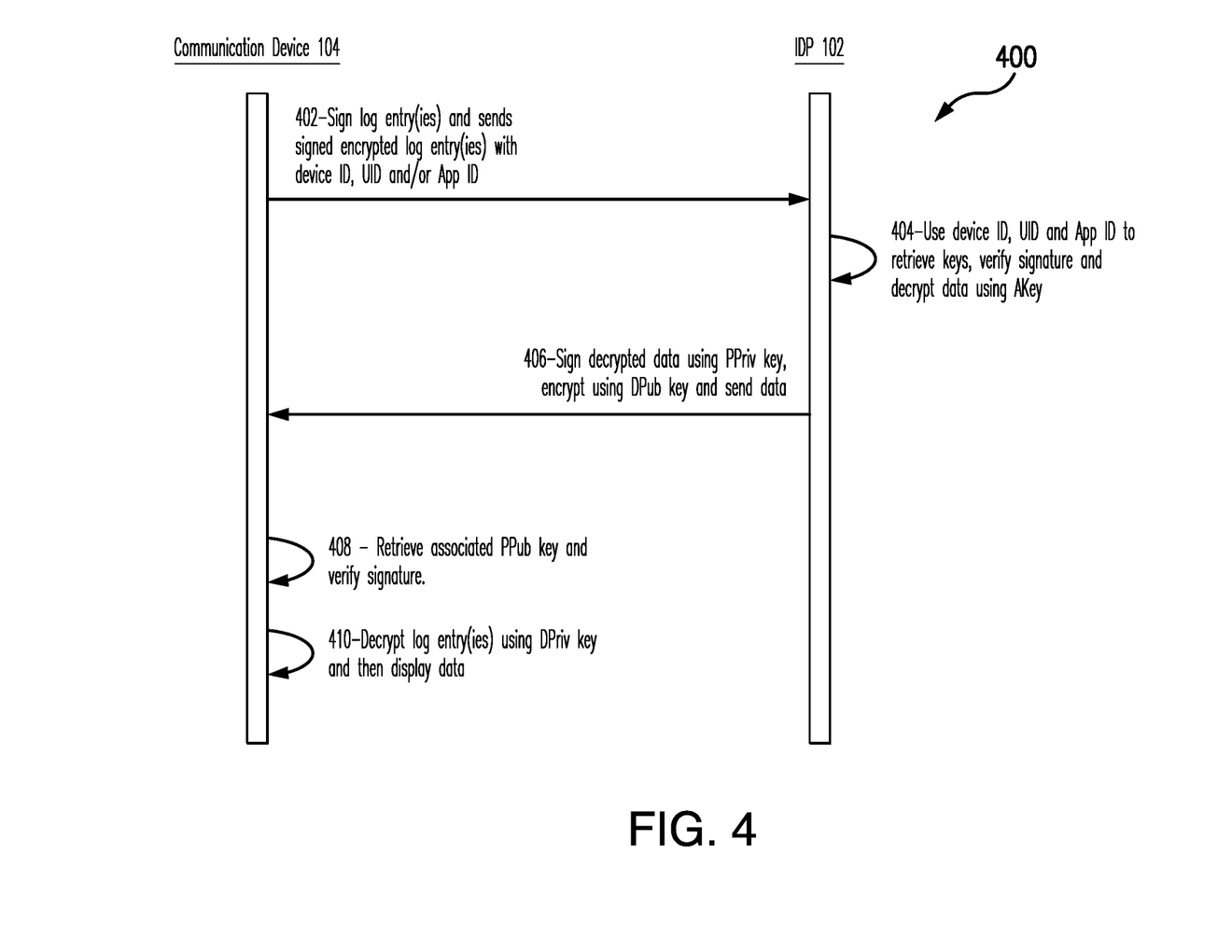
FIG. 4 illustrates an exemplary method, which may be implemented in connection with the system of FIG. 1, for use in presenting log entries and other data for a user, for example, to a relying party.

FIG. 4 illustrates an exemplary method 400 for use in presenting location data (and, potentially, other data) for a user, to a relying party, as associated with a digital identity for the user. The exemplary method 400 is again described as implemented in the IDP 102, the repository 118, and the communication device 104 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 400.

Like with FIG. 3, it should again be appreciated that the user 120 already has a digital identity, provisioned by the IDP 102, through registration, through which a travel history has been logged to the communication device 104. As such, the IDP 102 has stored a PPriv key in the repository 114, along with a DPub key and the AKey for the communication device 104 associated with the application ID, device ID, and/or UID of the mobile application 122, the communication device 104, and/or the user 120.

With reference to FIG. 4, the user 120 is requested to provide proof of a travel history in connection with one or more responses to inquiries by a relying party 114. For example, the user 120 may have traveled to a certain region at risk for one or more illnesses, or to a region adjacent or unrelated to the regions at risk for the one or more illnesses. The employer of the user 120 (e.g., as the relying party 114, etc.) may require proof of travel (and/or vaccination based on such travel, etc.) prior to permitting the user 120 to resume work. Or, a government agency (e.g., as the relying party 114, etc.) may require a travel history (and/or proof of vaccination, etc.) to permit entry into a country or to avoid quarantine, etc. In connection therewith, the user 120 provides an input to the mobile application 120 in the communication device 104 for the travel data (and/or vaccination data, etc.). In response, the communication device 104, at 402, retrieves the log entries for the user's digital identity therein, signs the log entries with the DPriv key of the communication device 104, and sends the signed, and still-encrypted, log entries to the IDP 102, along with the device ID, the UID, and/or application ID for the communication device 104, the user 120, and/or the mobile application 122. It should be appreciated that the communication device 104, in one or more embodiments, may limit the number of log entries retrieved, for example, based on a date range requested by the user 120 (e.g., last 90 days, six months, etc.), or based on a setting implemented by the user 120, etc.

Upon receipt of the request, at 404, the IDP 102 uses the device ID, UID, and/or application ID to retrieve the keys for the communication device 104 from the repository 118 (e.g., the DPub key, the AKey, and the PPriv key for the communication device 104, etc.). The IDP 102 also verifies the signature on the log entries with the DPub key and decrypts the log entries with the AKey, at 404.

The IDP 102, optionally, compiles the log entries into a data structure, e.g., a table, etc., and then encrypts, at 406, the log entries with the DPub key for the communication device 104. The encrypted log entries are also signed, by the IDP 102, with the PPriv key and sent to the communication device 104, at 406. The communication device 104, in turn, retrieves the PPub key for the IDP 102 and verifies, at 408, the signature with the PPub key. And then, once verified, the communication device 104 decrypts, at 410, the log entries with the DPriv key of the communication device 104 and displays the log entries at the communication device 104 (e.g., at the presentation unit 208, etc.) for viewing by the relying party 114. It should be appreciated that as part of the log entries displayed at the communication device 104 for the relying party 114, the source of the verification of the data (the airport 108 or log entry recorded at the port of entry 106, for example) may be included to inform the relying party 114 of the source of the entry (and the source of the verification, etc.), etc. While the above is described in connection with presenting location data for the user 120, from his/her digital identity, to the relying party 114, it should be appreciated that other data from the user's digital identity may be retrieved and presented to the relying party 114 in a similar manner.

Figure 5:
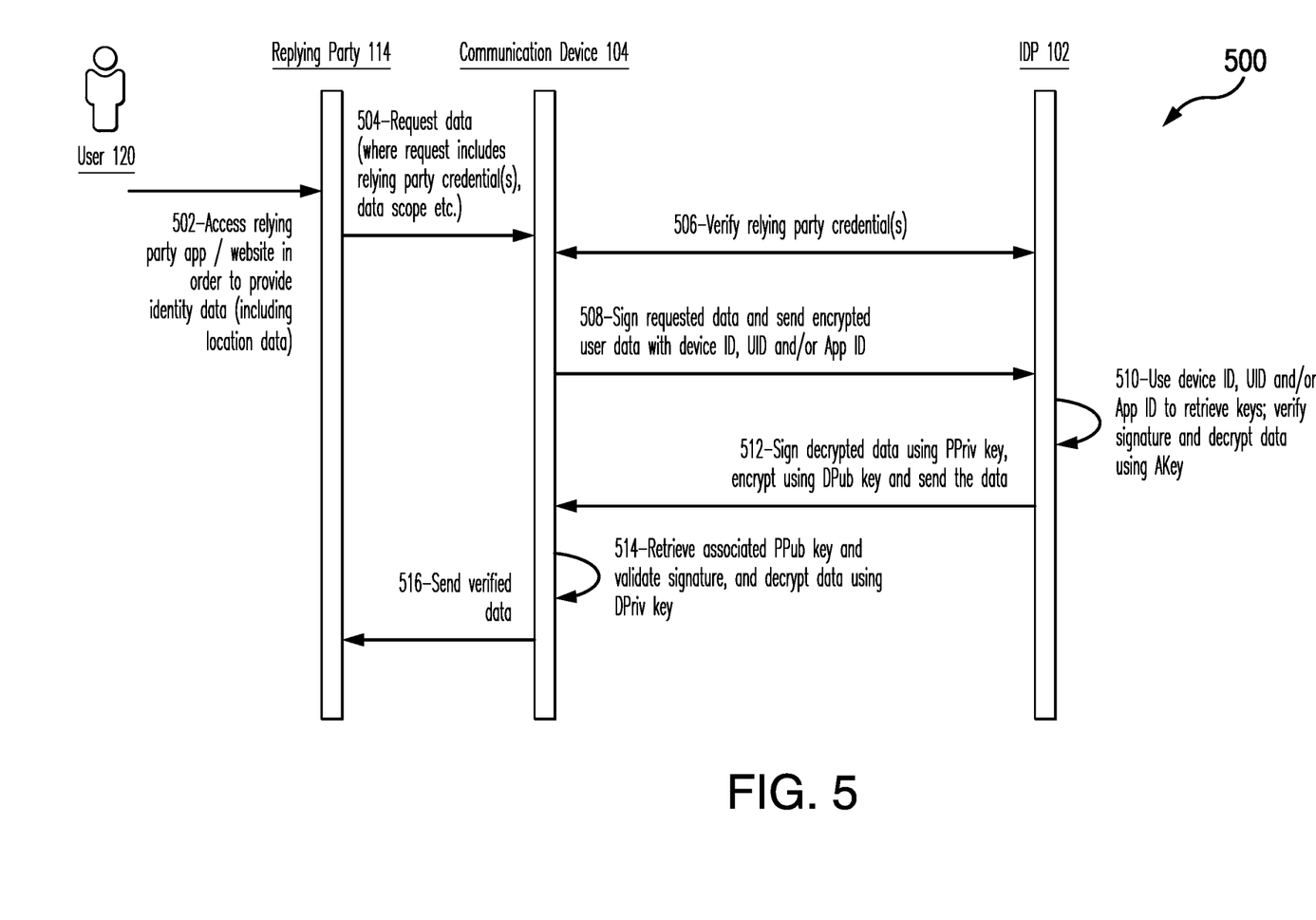
FIG. 5 illustrates an exemplary method, which may be implemented in connection with the system of FIG. 1, for use in requesting data for a user, by a relying party, as associated with a digital identity for the user.

FIG. 5 illustrates an exemplary method 500 for use in providing data for a user, as associated with a digital identity for the user, to a relying party. The exemplary method 500 is again described as implemented in the IDP 102, the repository 118, the relying party 114, and the communication device 104 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 500.

Like with FIGS. 3-4, it should be appreciated that the user 120 already has a digital identity, provisioned by the IDP 102, through registration, through which a travel history is appended thereto and logged to the communication device 104. As such, the IDP 102 has stored a PPriv key in the repository 114, along with a DPub key and an AKey for the communication device 104 associated with the application ID, device ID, and/or UID of the mobile application 122, the communication device 104, and/or the user 120. It should further be appreciated that the relying party 114 is registered with the IDP 102, whereby the relying party 102 is provisioned with a credential (e.g., a relying party ID, etc.) known to the IDP 102, and optionally, suitable to verify the relying party 114, etc.

With reference to FIG. 5, the user 120 is requested to provide proof of a travel history in connection with one or more responses to inquiries by the relying party 114. In particular, the user 120 interacts with the relying party 114 at a website or web application associated with the relying party 114. In connection with that interaction, the user 120 accesses, at 502, the website or application, in order to provide the requested data to the relying party 114, such as, for example, his/her travel history. In so doing, in this example, the relying party 114 may include a government agency associated with a travel restriction, and the user 120 may seek to provide a verified travel history to the government agency to be eliminated from the travel restriction, or to be included in some program or benefit related to the travel restriction, or otherwise. In response, the relying party 114 (and in particular, the website or application (or suitable software development kit (SDK) included therein)) requests, at 504, the data from the communication device 104, via an application programming interface (API) or via suitable protocols (e.g., OpenID™, etc.). The request includes, without limitation, a relying party credential (e.g., a relying party ID, etc.) and a description of the scope of the data requested, which in this example, is the travel history.

Despite the specific request for the travel history, it should be appreciated that the method 500 may be employed to provide other parts of the user's digital identity (e.g., a passport image or passport number, a name, an address, etc., for instance, when the relying party 114 is the port of entry 106; etc.), or the digital identity in whole to the relying party 114, etc.

In response to the request, the communication device 104 (via the mobile application 122) cooperates with the IDP 102 to verify, at 506, the relying party credential. This may include the communication device 104 passing the credential to the IDP 102, whereupon the IDP looks-up the credential in the repository 118 to confirm is valid and confirms the valid credential to the communication device 104. Other interactions, which may include or not, the relying party 114, may be employed to verify the relying party 114 and the request as being from the relying party 114.

Once verified, the communication device 104 retrieves the requested data, which includes the log entries in this example, and signs, at 508, the log entries with the DPriv key. The signed, and still-encrypted, log entries are then transmitted to the IDP 102, along with the device ID, the UID, and/or application ID for the communication device 104, the user 120, and/or the mobile application 122. It should be appreciated that the communication device 104, in one or more embodiments, may limit the data based on the request from the relying party 114 or otherwise, for example, based on a date range requested by the user 120 (e.g., last 90 days, six months, etc.), or based on a setting implemented by the user 120, etc.

Upon receipt of the request, at 510, the IDP 102 uses the device ID, UID, and/or application ID to retrieve the keys for the communication device 104 from the repository 118 (e.g., the DPub key, the AKey, and the PPriv key for the communication device 104, etc.). The IDP 102 then verifies the signature on the log entries with the DPub key and further decrypts the log entries with the AKey, at 510.

The IDP 102, optionally, compiles the log entries into a suitable data structure, e.g., a table, etc. (if not already in such a form), and then encrypts, at 512, the log entries with the DPub key for the communication device 104. The encrypted log entries are also signed, by the IDP 102, with the PPriv key and sent to the communication device 104. The communication device 104, in turn, retrieves, at 514, the PPub key for the IDP 102 from memory in the communication device 104 (e.g., in a secure element and/or trusted execution environment (TEE) thereof, in the Android Keystore® within an Android® operating system, etc.). The communication device 104 then verifies the signature with the PPub key and, once verified, the communication device 104 decrypts the log entries with the DPriv key of the communication device 104. The communication device 104 then sends, at 516, the log entries (in this example) to the relying party 114 for use by the relying party 114. The log entries may be sent to the relying party 114, through a URL specified by the relying party 114 (e.g., during registration with the IDP 102, or in connection with the request, etc.).

As described, users may be asked or required to provide travel histories (or travel records) for various reasons as part of interactions with relying parties. Often, though, such information may not be readily available to the users (and/or documents related thereto) or it may not be verified (whereby even when it is available, the relying parties may not know if the provided travel record and/or histories are accurate). What's more, privacy requirements may inhibit the relying parties from obtaining such information from entities other than the users (or, for that matter, for such other entities to actually maintain records of the users' travel). With that said, and in view of the above, the systems and methods herein provide for travel histories to be appended to digital identities of users, such that the travel histories are maintained by the users and verified by trusted parties directly involved in the users' travels. For instance, as the users travel from location to location, and interact with the various terminals described herein (as associated with the various trusted sources), the travel histories of the users are built and stored in a secure, verified, and encrypted manner (i.e., in data structure(s)) in the users' own communication devices or elsewhere. As can be appreciated, providing verified information in this manner, based upon the users' actual travel histories, enables the users to easily and efficiently (and generally automatically) track their travel histories and make the travel histories (verified) through and/or available from the communication devices to relying parties when necessary or desired.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, at a communication device, a log entry from a terminal; (b) signing, by the communication device, the log entry with a private key of a key pair specific to the communication device; (c) transmitting the signed entry log to an identity provider (IDP); (d) receiving, by the communication device, from the IDP, a signed, encrypted log entry; (e) verifying, by the communication device, a signature of the signed, encrypted log entry based on a public key associated with a key pair specific to the IDP; (f) appending the encrypted log entry to a digital identity included in the communication device; (g) generating the key pair specific to the communication device; (h) storing the private key of the key pair specific to the communication device in a memory of the communication device; and (i) transmitting the public key of the key pair specific to the communication device to the IDP, prior to receiving the log entry from the terminal; (j) transmitting the encrypted log entry to the IDP in response to an input indicative of a request from a relying party; (k) receiving, from the IDP, a second signed, encrypted log entry; (l) verifying, by the communication device, a signature of the second signed, encrypted log entry based on the public key associated with the key pair specific to the IDP; (m) decrypting the second signed, encrypted log entry with the private key of the key pair specific to the communication device; (n) signing the encrypted log entry with the private ley of the key pair specific to the communication device, prior to transmitting the encrypted log entry to the IDP; and (o) displaying the log entry at the communication device.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by an identity provider (IDP) coupled to a repository, a signed log entry and an identifier from a communication device; (b) retrieving, by the IDP, a public key and an attribute key specific to the communication device from the repository based on the identifier; (c) verifying, by the IDP, a signature of the log entry with the retrieved public key specific to the communication device; (d) encrypting, by the IDP, the log entry with the attribute key specific to the communication device; (e) transmitting, by the IDP, the encrypted log entry to the communication device, whereby the communication device stores the encrypted log entry as part of a digital identity included in the communication device; (f) signing, by the IDP, the encrypted log entry with a private key specific to the IDP, prior to transmitting the encrypted log entry to the communication device; (g) receiving, by the IDP, the encrypted log entry and the identifier from the communication device, in connection with an interaction by a user associated with the communication device and a relying party; and (h) in response to receiving the encrypted log entry from the communication device: (i) retrieving, by the IDP, the attribute key and the public key specific to the communication device from the repository based on the identifier; (ii) decrypting, by the IDP, the log entry with the attribute key specific to the communication device; (iii) encrypting, by the IDP, the log entry with the public key specific to the communication device; and (iv) transmitting, by the IDP, the log entry encrypted by the public key to the communication device, whereby the communication device decrypts the log entry with a private key specific to the communication device and displays the log entry to a relying party.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in appending one or more log entries to a data structure, the method comprising:
   receiving, at a communication device, a log entry from a terminal;
   signing, by the communication device, the log entry with a private key of a key pair specific to the communication device;
   transmitting the signed log entry to an identity provider (IDP);
   receiving, by the communication device, from the IDP, a signed, encrypted log entry;
   verifying, by the communication device, a signature of the signed, encrypted log entry based on a public key associated with a key pair specific to the IDP;
   appending the encrypted log entry to a digital identity included in the communication device;
   transmitting the encrypted log entry to the IDP in response to an input indicative of a request from a relying party;
   receiving, from the IDP, a second signed, encrypted log entry;
   verifying, by the communication device, a signature of the second signed, encrypted log entry based on the public key associated with the key pair specific to the IDP; and
   decrypting the second signed, encrypted log entry with the private key of the key pair specific to the communication device.

2. The computer-implemented method of claim 1, wherein the log entry received from the terminal includes a description of an interaction between a user and the terminal.

3. The computer-implemented method of claim 2, wherein the interaction between the user and the terminal is based on a digital identity of the user.

4. The computer-implemented method of claim 1, wherein the log entry received from the terminal is encrypted with and/or signed by a key specific to the terminal.

5. The computer-implemented method of claim 1, further comprising:
   generating the key pair specific to the communication device;
   storing the private key of the key pair specific to the communication device in a memory of the communication device; and
   transmitting a public key of the key pair specific to the communication device to the IDP, prior to receiving the log entry from the terminal.

6. The computer-implemented method of claim 1, further comprising signing the encrypted log entry with the private ley of the key pair specific to the communication device, prior to transmitting the encrypted log entry to the IDP.

7. The computer-implemented method of claim 1, further comprising displaying the log entry at the communication device.

8. The computer-implemented method of claim 1, wherein the second signed, encrypted log entry includes multiple encrypted log entries.

9. The computer-implemented method of claim 1, further comprising sending, by the communication device, the decrypted second log entry to the relying party, in response to the request from the relying party.

10. A system for use in appending one or more log entries to a data structure, the system comprising:
    a repository including an attribute key and a public key specific to a communication device; and
    an identity provider (IDP) computing device coupled to the repository and configured to:
      receive a signed log entry and an identifier from the communication device;
      retrieve the public key and the attribute key specific to the communication device from the repository based on the identifier;
      verify a signature of the log entry with the retrieved public key specific to the communication device;
      encrypt the log entry with the attribute key specific to the communication device;
      transmit the encrypted log entry to the communication device, whereby the communication device stores the encrypted log entry as part of a digital identity included in the communication device;
      receive the encrypted log entry and the identifier from the communication device, in connection with an interaction by a user associated with the communication device and a relying party; and
      in response to receipt of the encrypted log entry from the communication device:
        retrieve the attribute key and the public key specific to the communication device from the repository based on the identifier;
        decrypt the log entry with the attribute key specific to the communication device;
        encrypt the log entry with the public key specific to the communication device; and
        transmit the log entry encrypted by the public key to the communication device, whereby the communication device decrypts the log entry with a private key specific to the communication device and displays the log entry to a relying party.

11. The system of claim 10, wherein the IDP computing device includes the repository.

12. The system of claim 10, wherein the IDP computing device is configured to sign the encrypted log entry with a private key specific to the IDP computing device, prior to transmitting the encrypted log entry to the communication device.

13. The system of claim 10, further comprising a terminal configured to transmit the log entry to the communication device in response to a digital identity of the user being presented to a trusted source associated with the terminal.

14. A non-transitory computer-readable storage medium comprising executable instructions for use in appending one or more log entries to a data structure associated with a digital identity of a user, which when executed by at least one processor of a communication device, cause the at least one processor to:
    receive a log entry from a terminal;
    sign the log entry with a private key of a key pair specific to the communication device;

transmit the signed log entry to an identity provider (IDP);
receive, from the IDP, a signed, encrypted log entry;
verify a signature of the signed, encrypted log entry based on a public key associated with a key pair specific to the IDP;
append the encrypted log entry to a digital identity included in the communication device;
transmit the encrypted log entry to the IDP in response to an input indicative of a request from a relying party;
receive, from the IDP, a second signed, encrypted log entry;
verify a signature of the second signed, encrypted log entry based on the public key associated with the key pair specific to the IDP; and
decrypt the second signed, encrypted log entry with the private key of the key pair specific to the communication device.

15. The non-transitory computer-readable storage medium of claim 14, wherein the log entry received from the terminal includes a description of an interaction between a user and the terminal based on a digital identity of the user.

16. The non-transitory computer-readable storage medium of claim 14, wherein the executable instructions, when executed by the at least one processor, further cause the at least one processor to:
generate the key pair specific to the communication device;
store the private key of the key pair specific to the communication device in a memory of the communication device; and
transmit a public key of the key pair specific to the communication device to the IDP, prior to receiving the log entry from the terminal.

17. The non-transitory computer-readable storage medium of claim 14, wherein the executable instructions, when executed by the at least one processor, further cause the at least one processor to sign the encrypted log entry with the private ley of the key pair specific to the communication device, prior to transmitting the encrypted log entry to the IDP.

18. The non-transitory computer-readable storage medium of claim 17, wherein the second signed, encrypted log entry includes multiple encrypted log entries.

19. The non-transitory computer-readable storage medium of claim 14, wherein the executable instructions, when executed by the at least one processor, further cause the at least one processor to: send the decrypted second log entry to the relying party, in response to the request from the relying party.

* * * * *